United States Patent Office 2,805,224
Patented Sept. 3, 1957

2,805,224

PROCESS FOR THE PRODUCTION OF VAT DYESTUFFS OF THE "BENZANTHRON-IMIDE GREEN" SERIES

Fritz Baumann, Leverkusen-Bayerwerk, and Hans-Samuel Bien, Leverkusen, Germany, assignors to Farbenfabriken Bayer Aktiengesellschaft, Leverkusen, Germany, a corporation of Germany No Drawing. Application July 7, 1955,
Serial No. 520,621

Claims priority, application Germany July 13, 1954

10 Claims. (Cl. 260—274)

This invention relates to a process for the production of vat dyestuffs of the "benzanthronimide green" series.

It is already known from German specification No. 533,500 that grey vat dyestuffs can be obtained from an alkali melt of Bz-1-benzanthronyl-5-amino-1,1'-dianthrimides.

FORMULA I

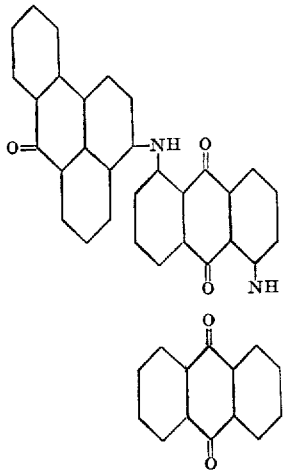

The same dyestuff can also be obtained if "5-amino-benzanthronimide green"

FORMULA II

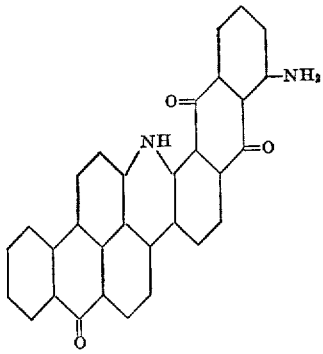

is reacted with α-chloroanthraquinone, as disclosed in German specification No. 546,228.

It is also known that from a NaCl/AlCl₃ melt of the grey dyestuffs obtained, it is possible to produce compounds which dye vegetable fibers in olive shades.

It is an object of the present invention to provide novel vat dyestuffs. A fu..ther object is to provide novel dyestuffs which are very powerful and have good fastness properties. Other objects will appear hereinafter.

These objects are attained in accordance with the present invention by melting Bz-1-benzanthronyl-5-amino-1,1'-dianthrimides with complex compounds of aluminum chloride with bases.

Examples of bases which can be used in the production of the aluminum complex compounds for use in the process of the invention are pyridine, a mixture of pyridine bases, isoquinoline, quinoline and its homologues, dimethyl aniline, dimethylamine, trimethylamine and ammonia.

The weight ratio between the anthrimide and the aluminum chloride complex compounds can be varied within wide limits, for example 1:2 to 1:10. As condensation temperature preferably a temperature in the range between 120 and 170° C. is used. The melt can be formed with or without the addition of copper powder.

It has also been found that the same dyestuffs can be obtained from an alkali melt of Bz-1-benzanthronyl-5-amino-1,1'-dianthrimide carbazole.

If the novel dyestuffs produced by the process of the present invention are after-treated with fuming sulfuric acid (containing 2 to 20% of sulfur trioxide) or chlorosulphonic acid, they are converted into other dyestuffs which dissolve with a blue color in sulfuric acid and dye cotton in very fast and olive shades.

The dyestuffs obtainable by the process of the present invention dye cotton greenish-brown, olive or khaki-colored. They are generally very powerful and are very fast to light and washing.

The following examples further illustrate the invention without, in any way, limiting it:

*Example 1*

15 parts of Bz-1-benzanthronyl-5-amino-1,1'-dianthrimide are introduced at 110° C. into 165 parts of pyridine and 75 parts of aluminum chloride, and the temperature is maintained for three hours at 120° C. The initially violet color of the melt gradually changes to brown. After the reaction has ended, the melt is added to hot caustic soda solution and the pyridine is driven off by means of steam. The dyestuff, which forms in brown flakes, is filtered off, freed from adhering aluminum salts by boiling several times with hydrochloric acid or caustic soda solution, and then washed until neutral. The dyestuff dissolves in sulfuric acid-monohydrate with an olive-green color and dyes cotton from a brown vat in fast and strongly khaki-colored shades.

10 parts of the dyestuff are introduced into 100 parts of chlorosulphonic acid at 40° C. The dyestuff dissolves initially with a green color, but this color changes to a relatively clear blue in the course of two hours. Then the mixture is poured onto ice, the dyestuff filtered off and washed neutral. The novel product dyes cotton from a khaki-colored vat in greenish-khaki shades having very good fastness properties. The color of the solution in sulfuric acid is blue.

*Example 2*

16 parts of Bz-1-benzanthronyl-5-amino-1,1'-dianthrimide are introduced at 130° C. into 160 parts of isoquinoline and 80 parts of aluminum chloride, and this temperature is maintained for two hours. In the course of the reaction, the initially reddish-brown solution changes to a greenish-brown solution. After the reaction, the melt is introduced into hydrochloric acid and the dyestuff forming in brown flakes is freed from the aluminum salts and isoquinoline by being boiled several times with acid. It is thereafter washed until neutral. It is almost identical with the product described in Example 1.

*Example 3*

25 parts of aluminum chloride are added to 60 parts of quinoline, the melt assuming an olive-green color. 5 parts of Bz-1-benzanthronyl-5-amino-1,1'-dianthrimide are introduced at 110° C., and the temperature is maintained at 130° C. for about two hours, the color of the melt changing from red to currant-colored. If working up is carried out as indicated in Example 1, a dyestuff is obtained which dyes vegetables fibers in khaki-colored shades from a brown vat. The dyestuff dissolves in sulfuric acid-monohydrate with an olive-green color.

*Example 4*

25 parts of aluminum chloride are dissolved in 60 parts of dimethyl aniline and 5 parts of Bz-1-benzanthronyl-5-amino-1,1'-dianthrimide are introduced at 110° C. into the solution thus formed, which is initially green but then becomes blue. The melt is heated for about one hour at 115° C. If the substance is worked up in the manner indicated in Example 1, an olive vat dyestuff is obtained which vats with an olive brown color and which dissolves with an olive-green color in sulfuric acid.

*Example 5*

Dry ammonia is passed over 100 parts of aluminum chloride until a melt is obtained which is liquid at 130 to 140° C. 5 parts of dimethyl aniline are added and, after introducing 5 parts of Bz-1-benzanthronyl-5-amino-1,1'-dianthrimide, the temperature is kept for about two hours at 140° C. On completion of the reaction, the melt is added to water and boiled with hydrochloric acid until it is no longer possible to detect any aluminum chloride in the filtrate. The novel dyestuff produced dissolves with a reddish-blue color in sulfuric acid and dyes cotton from a brownish-red vat in greenish-brown shades having good fastness properties.

*Example 6*

100 parts of potassium hydroxide are dissolved in 90 parts of methanol and 10 parts of a reaction product of the carbazole of 5-amino-1,1'-dianthrimide and Bz-1-bromobenzanthrone are introduced at 110° C. The temperature is raised in one hour to 150° C. and maintained at this temperature for two hours. Part of the initial product enters into solution with a bluish-grey color. After adding water, the dyestuff is precipitated by means of air or sodium hypochlorite from a brown vat in the form of brown flakes, which are filtered and washed until they show a neutral reaction. The dyestuff obtained is identical with that described in Example 1.

*Example 7*

15 parts of the dyestuff obtained by following the procedure of Example 2 are dissolved in 50 parts of fuming sulfuric acid (containing 10% of sulfur trioxide) at 5 to 10° C. The solution is kept at this temperature for some time. As soon as a worked up sample of the dyestuff dissolves in pyridine-water containing 10% of pyridine, the reaction mixture is poured onto ice, the precipitated dyestuff filtered off and washed neutral with hot sodium chloride solution.

We claim:

1. As novel dyestuffs the dyestuff obtained by treating Bz-1-benzanthronyl-5-amino-1,1'-dianthrimides with a complex compound of aluminum chloride with a base of the group consisting of amines and ammonia at elevated temperature and recovering the dyestuff formed.

2. As novel dyestuffs the dyestuff obtained by treating Bz-1-benzanthronyl-5-amino-1,1'-dianthrimide with a complex compound of aluminum chloride with a base of the group consisting of amines and ammonia at elevated temperature, recovering the dyestuff formed and subjecting this dyestuff to an after-treatment with a member selected from the group consisting of fuming sulfuric acid and chlorosulphonic acid and recovering the dyestuff thus treated.

3. As novel dyestuff the dyestuff obtained by treating Bz-1-benzanthronyl-5-amino-1,1'-dianthrimide with a complex compound of aluminum chloride and pyridine at elevated temperature and recovering the dyestuff formed.

4. As novel dyestuff the dyestuff as claimed in claim 3, which is subjected to an after-treatment with a member selected from the group consisting of chlorosulphonic acid and fuming sulfuric acid.

5. The process for the production of vat dyestuffs which comprises treating at elevated temperature Bz-1-benzanthronylamino-1,1'-dianthrimides with a complex compound of aluminum chloride and a base of the group consisting of amines and ammonia and recovering the dyestuff formed.

6. The process for the production of the vat dyestuffs of claim 5, which comprises subjecting Bz-1-benzanthronylamino-1,1'-dianthrimide carbazole to an alkali melt and recovering the dyestuff formed.

7. The process of claim 5, wherein the dyestuff obtained is after-treated with a member selected from the group consisting of fuming sulphonic acid and chlorosulphonic acid.

8. The process for the production of vat dyestuffs, which comprises treating at elevated temperature Bz-1-benzanthronylamino-1,1'-dianthrimides with a complex compound of aluminum chloride and pyridine and recovering the dyestuff formed.

9. The process as claimed in claim 8, wherein the dyestuff obtained is after-treated with chlorosulphonic acid.

10. The process for the production of a vat dyestuff which comprises subjecting Bz-1-benzanthronylamino-1,1'-dianthrimide carbazole to an alcoholic alkali melt and recovering the dyestuff formed.

References Cited in the file of this patent

UNITED STATES PATENTS

| | | |
|---|---|---|
| 1,903,181 | Honald | Mar. 28, 1933 |
| 1,936,716 | Honald | Nov. 28, 1933 |
| 2,278,977 | Deltwyler | Apr. 7, 1942 |

UNITED STATES PATENT OFFICE

Certificate of Correction

Patent No. 2,805,224 September 3, 1957

Fritz Baumann et al.

It is hereby certified that error appears in the printed specification of the above numbered patent requiring correction and that the said Letters Patent should read as corrected below.

Column 1, the structural formula under "FORMULA I" should appear as shown below instead of as in the patent—

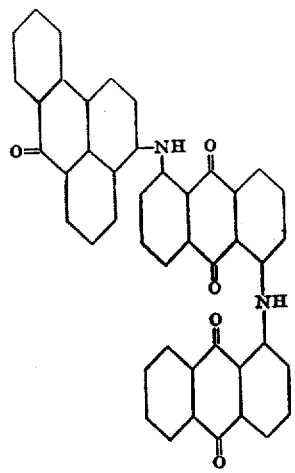

column 4, line 39, for "sulphonic" read —sulfuric—.

Signed and sealed this 28th day of January 1958.

[SEAL]

Attest:
KARL H. AXLINE,
*Attesting Officer.*

ROBERT C. WATSON,
*Commissioner of Patents.*